April 14, 1959    H. G. THULKE    2,881,897
CHANNELING DEVICE FOR AN ARTICLE TRANSFERRING APPARATUS
Filed Oct. 11, 1956    2 Sheets-Sheet 1

INVENTOR.
Hermann G. Thulke
BY
Connolly and Hutz
ATTORNEYS

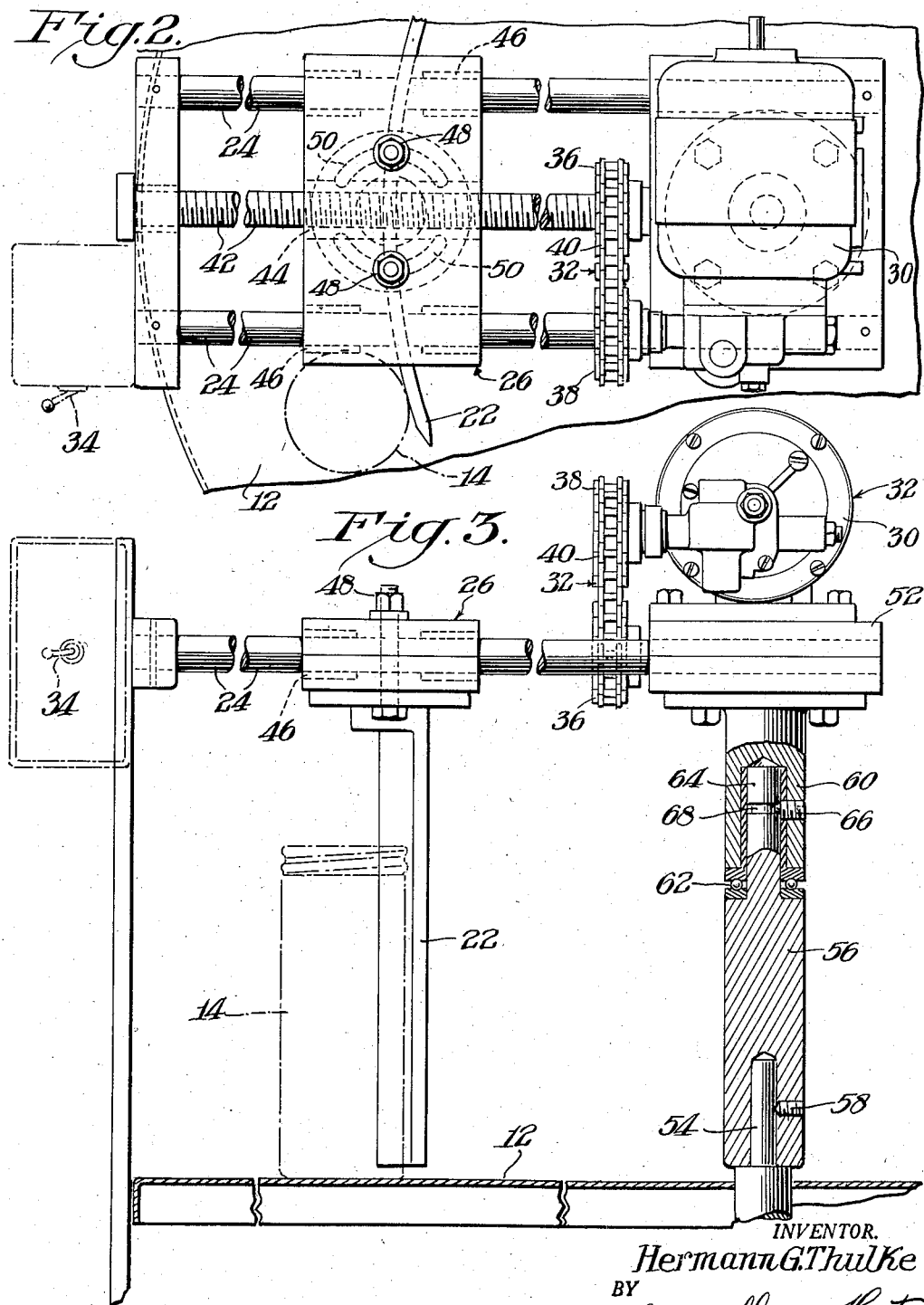

2,881,897

CHANNELING DEVICE FOR AN ARTICLE TRANSFERRING APPARATUS

Hermann G. Thulke, Massapequa, N.Y., assignor to Chas. Pfizer & Co., New York, N.Y., a corporation of Delaware Application October 11, 1956, Serial No. 615,297

8 Claims. (Cl. 198—30)

This invention relates to a device for controlling the flow of articles deposited on an article storage and transferring device, and more particularly to a device for channeling the flow of articles deposited on a rotating accumulator table.

Accumulator tables are used to store and transfer articles from one conveyor belt or system to another. A steady supply of articles is thereby insured for the final conveyor system even through the first system may operate at a different speed or run intermittently. A cushion or reserve supply of articles is built up on these accumulator tables to insure a constant flow through the overall system even though individual stages may be periodically shut down for any reason, such as a breakdown.

These accumulator tables are circular in shape and rotate in a horizontal plane, and inlet and outlet conveyors are engaged with the periphery of the table. As the articles travel around the periphery of the table from the inlet conveyor to the outlet conveyor, a normally operative channeling means, such as a chute, directs them to the outlet conveyor. When the rate of delivery of articles to the accumulator table exceeds the rate of discharge, an accumulation is built up in the central portions of the table.

When the rate of delivery falls below the rate of discharge, articles stored in the center of the table must be moved to the periphery where they can be picked up by the chute. The movement of articles from the center of the table to the periphery may be manually or mechanically accomplished. The maintenance of an employee at the table for optionally moving centrally stored articles to the outlet conveyor involves a considerable expenditure of labor-time and expense. Existing mechanical means utilize continuous barriers extending from the center of the table towards the outlet conveyor. These continuous barriers, however, severely reduce the storage capacity of the accumulator table.

An object of this invention is to provide a channeling device which is conveniently adjustable over a variety of operating conditions and which does not appreciably decrease the storage capacity of the accumulator table.

In accordance with this invention, a substantially rigid deflecting element, whose overall length is less than the radius of the table, is disposed adjacent to the surface of the table. This deflecting element is mounted, by an adjustable coupling means, on a guide means which extends substantially across the path of movement of the surface of the table. This permits the deflecting element to be selectively positioned and to be traversed to selected portions of the surface of the table. The deflector may be placed at an intermediate position to sweep a band adjacent the periphery to compensate for slight delivery lags, yet leave the center free for storage. When articles deposited upon the center of the table and stored there during periods of excess of supply over delivery are required at the periphery of the table to feed the exit conveyor, the deflecting element may be moved at will to sweep the central portions and direct articles stored there to the peripheral portions of the table. The deflecting element may also be positioned at the center of the table so as to interfere to a minimum with articles deposited thereon. Remote means may be provided to allow an operator to conveniently move and position the deflecting element.

Novel features and advantages of the present invention will become apparent to one skilled in the art from a reading of the following description in conjunction with the accompanying drawings in which:

Fig. 2 is an enlarged plan view of a portion of the embodiment shown in Fig. 1; and Fig. 3 is a view in elevation partially in cross section of the portion of the embodiment shown in Fig. 2.

Figure 1:
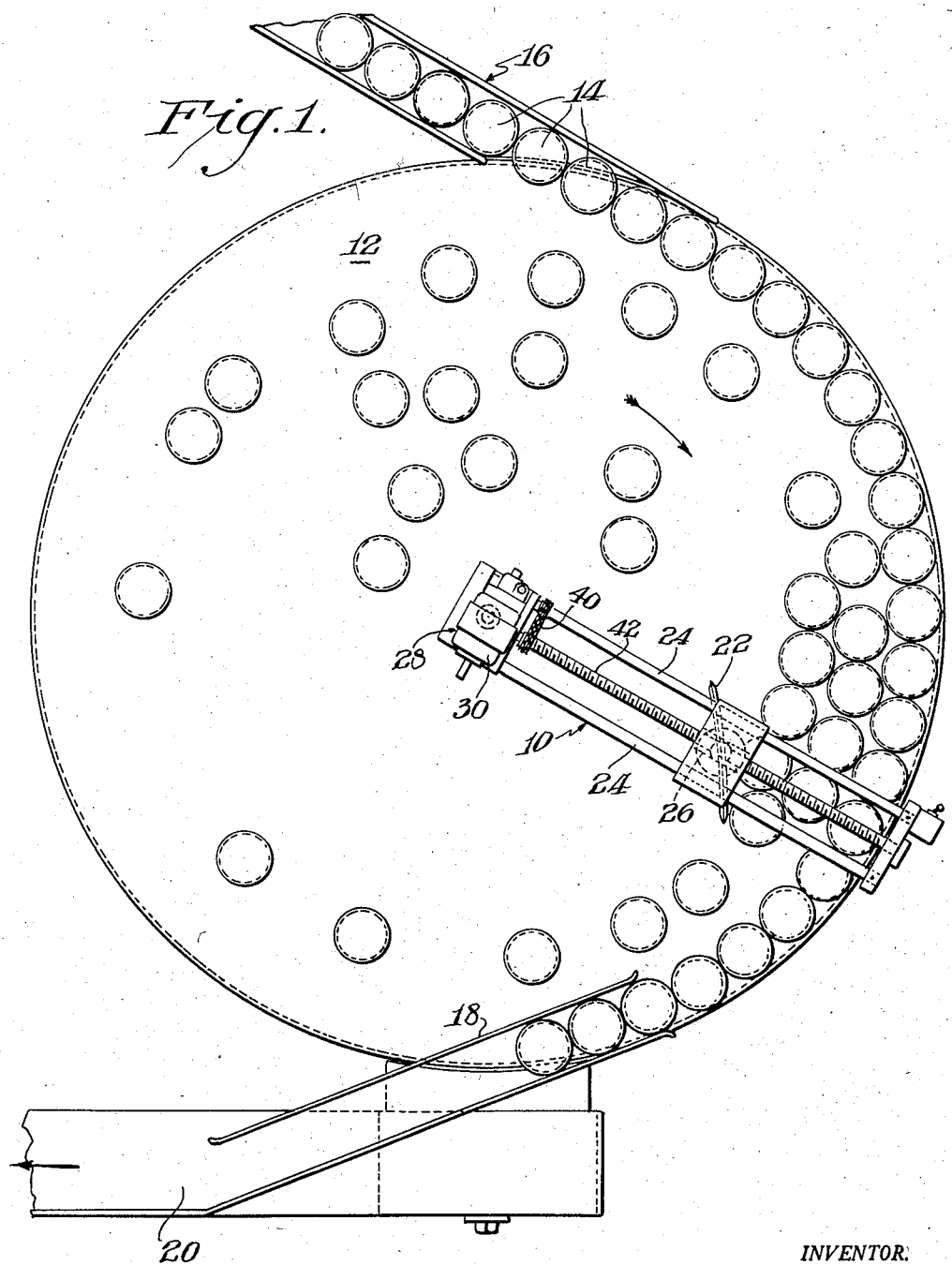
Fig. 1 is a plan view of one embodiment of this invention.

In Fig. 1 a novel channeling device 10 is mounted upon an accumulator table 12. Articles 14, small vials or bottles for example, are delivered to the periphery of the rotating accumulator table 12 by an inlet conveyor 16 and are carried about the periphery of the rotating accumulator table, in the indicated direction, to peripheral outlet chute 18 which directs them to an outlet conveyor 20.

Channeling device 10 includes a deflecting element 22 mounted upon a guide means 24, a pair of parallel rods for example, by an adjustable coupling means 26, a lead screw and split nut arrangement for example. A remotely operable means 28, including electric motor 30 and transmission 32 for example, is provided for allowing deflecting element 22 to be positioned at any point along the path of the rotating surface of accumulator table 12. Switch 34 is provided for allowing an operator to optionally actuate electric motor 30. A convenient motor for the indicated service is a fractional horsepower, such as a ⅟₁₅₀ horsepower gear-head motor providing an output of 100 r.p.m.

Referring to Figs. 2 and 3, transmission 32 includes a pair of sprocket wheels 36 and 38 of equal diameter to provide a 1:1 ratio and a sprocket chain 40. Details of the sprocket transmission and electrical connections are omitted since they are conventional.

Deflecting element 22 is made substantially rigid, of ¼" sheet aluminum for example. It is slightly curved, for example to approximately match the periphery of the table. The inlet and outlet edges of deflecting element 22 are pointed to prevent snagging of article. As shown in Fig. 3, the deflecting element extends downward to almost touch the surface of rotating table 12.

Coupling means 26 includes a lead screw 42 and a split or traveling nut 44. Lead screw 42 may be advantageously made of stainless steel for example of any suitable diameter and pitch. Guide means provided by parallel rods 24 are engaged by bronze bearings 46 (4 in all) inserted in suitable holes provided in coupling means 26. These bearings may be bronze oilite bearings, for example, which provide a minimum of friction when traveling along stainless steel guide rods 24.

Deflecting element 22 is secured to coupling means 26 by a pair of nuts and bolts 48 extending through circular slots 50 in coupling means or carriage 26. Deflecting element 22 accordingly may be angularly as well as radially positioned relative to guide means 24 and the surface of table 12.

Referring to Fig. 3, motor 30 and transmission arrangement 32 are secured to a base plate 52 which is mounted upon the rotating center 54 of accumulator table 12 through an extension 56 fastened to center 54 by a set screw 58. Plate 52 is fastened to a column 60 which is rotatably coupled to extension 56 by means of a ball bearing 62. Column 60 is maintained in longitudinal engagement with reduced diameter top 64 of extension 56 by means of a set screw 66 engaged in groove 68.

Operation

When the flow of articles 14 from the delivery conveyor 16 is in excess of those abstracted by outlet conveyor 18, deflecting element 22 is positioned, for example as shown in Fig. 1, to sweep an intermediate band. It can then compensate for short stoppages but still allow a cushion of articles 14 to be built up upon the central portion of the accumulator table. When supply is far in excess of delivery, deflecting element 22 may be moved to the center of the table where it interferes to a minimum with the storage of articles on the table.

When the rate of supply of articles to the rotating accumulator table falls below the discharge rate, deflecting element 22 may be moved in a number of radially outward sweeps to move articles stored at the center of the table to outer portions thereof. When a sufficient number of articles have been moved, to clear the center of the table and to load the peripheral portions of the table, deflecting element 22 may be positioned as shown in Fig. 1 to channel these articles to the outlet chute 18 as they are required. Deflecting element 22 in this position does not interfere with passage of additional articles 14 onto the table, but peripherally redirects articles which just clear outlet chute 18. In the position shown in Fig. 1, deflecting element 22 also permits a build-up or cushion of supply of articles to be built up in the center of the table if the supply should suddenly exceed the delivery rate.

If the supply of articles should become extremely sparse, deflecting element 22 can be positioned at the extreme periphery of table 12 to direct all articles into outlet chute 18. The angle of deflecting element 22 may be adjusted by means of nuts and bolts 48 and slots 50 to provide optimum sweeping and redirecting.

Deflecting element 22 may be conveniently moved to any of the indicated positions or to any other advantageous position along guide means 24 by actuation of switch 34. This energizes motor 30 which rotates lead screw 42 through sprocket and chain transmission 32. Nut 44 is accordingly moved along lead screw 42 to reposition coupling means 26 and attached deflecting element 22.

A channeling device is accordingly provided which may be conveniently and remotely adjusted by an operator to a great variety of positions in accordance with supply and delivery requirements, and which in each of these positions interferes to a minimum with the storage of articles on the rotating accumulator table.

What is claimed is:

1. A device for channeling articles deposited on a rotating accumulator table comprising a substantially rigid deflecting element disposed adjacent the surface of said table, the overall length of said deflecting element being less than ½ the radius of said table, guide means extending radially substantially across the path of movement of the surface of said table, adjustable coupling means mounting said deflecting element upon said guide means to permit said deflecting element to be selectively radially positioned upon said guide means so that said deflecting element is traversed by selected annular portions of the surface of said table leaving the remaining portions of said table free of the effect of said deflecting element and said guide means and said deflecting element being constructed and arranged to leave the central portion of said table free of the effect of said deflecting element when said deflecting element is positioned to traverse outer annular portions of said table.

2. A device as set forth in claim 1 wherein said guide means is comprised of a pair of guide rods extending from the center of said table to the periphery of said table.

3. A device as set forth in claim 1 wherein said adjustable coupling means is comprised of a lead screw and traveling nut arrangement.

4. A device as set forth in claim 3 wherein an electric motor is coupled by a transmission to said lead screw for moving said deflecting element to selected radial positions along said guide means.

5. A device as set forth in claim 4 wherein said motor is rotatably mounted upon the rotating center of said table by means of a bearing.

6. A device as set forth in claim 1 wherein said coupling means includes arcuate means for permitting the angular position of said deflecting element to be adjusted.

7. A device as set forth in claim 1 wherein said adjustable coupling means includes rotatable means for varying the angle at which said deflecting element is mounted upon said guide means.

8. A device as set forth in claim 7 wherein said deflecting element is comprised of a curved blade, and the shape of said curved blade substantially corresponds to the shape of the periphery of said accumulator table.

References Cited in the file of this patent

UNITED STATES PATENTS

| | | |
|---|---|---|
| 1,797,809 | Turrettini | Mar. 24, 1931 |
| 2,422,495 | Morrow | June 17, 1947 |
| 2,629,481 | Stover | Feb. 24, 1953 |
| 2,642,173 | Wehmiller | June 16, 1953 |